US006620902B2

(12) United States Patent
Shimoda et al.

(10) Patent No.: US 6,620,902 B2
(45) Date of Patent: Sep. 16, 2003

(54) PROCESS FOR PREPARING POLYCARBONATE AND APPARATUS FOR PREPARING POLYCARBONATE

(75) Inventors: Tomoaki Shimoda, Ichihara (JP); Akio Ikeda, Ichihara (JP); Takato Kimura, Ichihara (JP); Ken Tamada, Ichihara (JP); Hans-Peter Brack, Herrliberg (CH); Dennis Karlik, Bergen op Zoom (NL); Lina Prada, Murcia (ES); Hendricus Franciscus Zirkzee, Schore (NL); James Anthony Cella, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/063,282

(22) Filed: Apr. 8, 2002

(65) Prior Publication Data

US 2003/0088051 A1 May 8, 2003

(30) Foreign Application Priority Data

Jul. 17, 2001 (JP) .................................. 2001-217251

(51) Int. Cl.[7] .............................................. C08G 64/00
(52) U.S. Cl. ............................ 528/196; 427/7.1; 427/8; 528/198
(58) Field of Search ................................ 528/196, 198; 427/8, 7.1

(56) References Cited

U.S. PATENT DOCUMENTS

| 4,310,656 | A | 1/1982 | Brunelle | 528/200 |
|---|---|---|---|---|
| 5,413,253 | A | 5/1995 | Simmen | 222/137 |
| 5,767,224 | A | 6/1998 | Kuhling et al. | 528/196 |
| 6,294,642 | B1 * | 9/2001 | Shimoda et al. | 528/196 |
| 6,346,290 | B1 * | 2/2002 | Schultz et al. | 427/8 |
| 2002/0119243 | A1 * | 8/2002 | Schultz et al. | 427/2.11 |

FOREIGN PATENT DOCUMENTS

| CA | 2083326 | 5/1994 | ........... C08G/64/62 |
|---|---|---|---|
| EP | 0608778 | 8/1994 | ........... C08G/64/30 |
| EP | 0683192 | 11/1995 | ........... C08G/64/14 |
| EP | 0982340 | 3/2000 | ........... C08G/64/20 |
| JP | 63179301 A | 7/1988 | ............. G02B/1/04 |
| JP | 02175723 A | 7/1990 | ........... C08G/64/30 |
| JP | 05131126 A | 5/1993 | ............. B01F/5/00 |
| JP | 06157739 A | 6/1994 | ........... C08G/64/30 |
| JP | 07090074 A | 4/1995 | ........... C08G/64/30 |

OTHER PUBLICATIONS

English Abstract of EP0683192.
International Search Report dated Sep. 26, 2002.

* cited by examiner

Primary Examiner—Terressa M. Boykin

(57) ABSTRACT

A process for preparing an end-capped polycarbonate comprises melt reacting an aromatic dihydroxy compound, a carbonic acid diester, and optionally a catalyst in a prepolymerization vessel to form a polycarbonate product; transferring the polycarbonate product from the prepolymerization vessel; mixing the polycarbonate product with an end-capping agent under hermetic seal at a pressure of at least about 760 mm Hg; and transferring the polycarbonate product and end-capping agent mixture to a postpolymerization vessel to endcap the polycarbonate product. An apparatus for preparing an end-capped polycarbonate comprises a prepolymerization vessel having and inlet and an outlet; a postpolymerization vessel having an inlet and an outlet; a mixer in fluid communication with the outlet of the prepolymerization vessel and the inlet of the postpolymerization vessel; and a charging port through which an end-capping agent is charged to the mixer, wherein the mixer is hermetically sealed at greater than or equal to 760 mm Hg.

14 Claims, 2 Drawing Sheets

[Fig. 1]
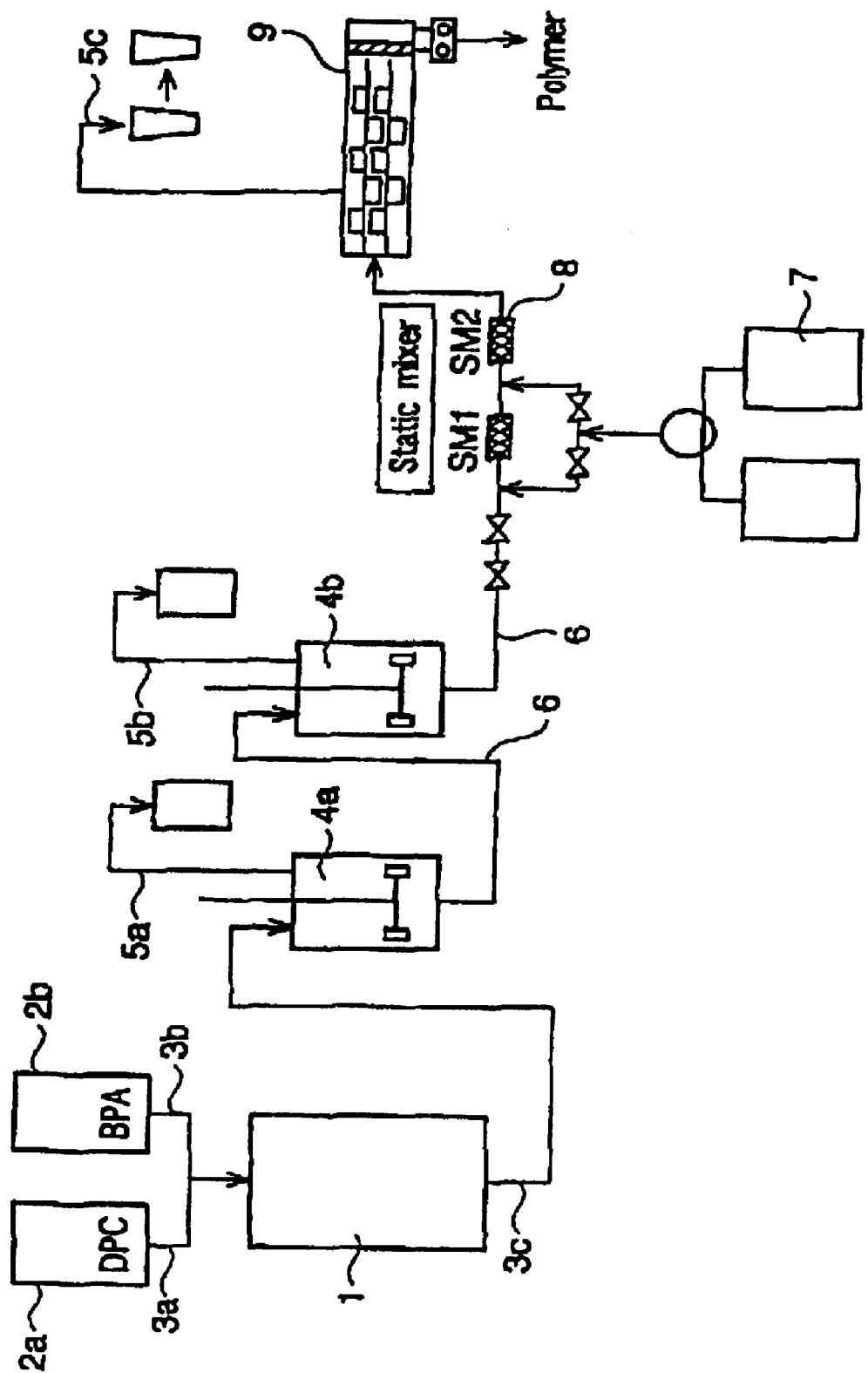

[Fig. 2]
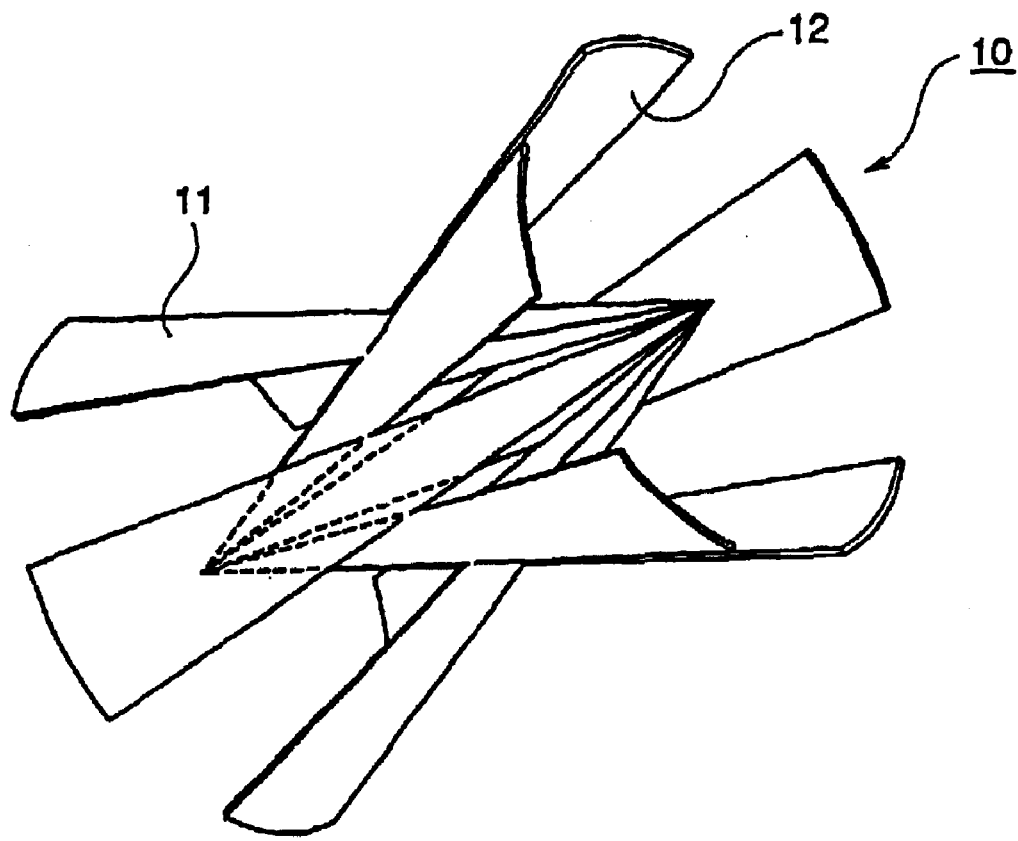
[Fig. 3]
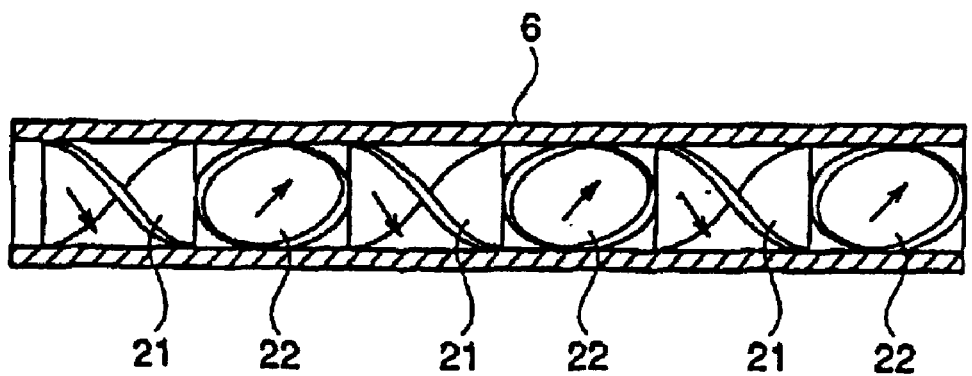

PROCESS FOR PREPARING POLYCARBONATE AND APPARATUS FOR PREPARING POLYCARBONATE

CROSS REFERENCE TO RELATED APPLICATIONS

The present application is based upon and claims priority to Japanese Application No. 2001-217251, with a filing date of Jul. 17, 2001, which is hereby incorporated by reference.

BACKGROUND OF INVENTION

A process for preparing polycarbonates and an apparatus for use in the process are disclosed herein.

Polycarbonates are widely used for their outstanding mechanical properties, such as impact resistance, heat resistance, and transparency. Processes known in the art for preparing polycarbonates include, for example, an interfacial process and a melt process. In the interfacial process, an aromatic diol, such as bisphenol A is directly reacted with phosgene. The melt process includes transesterification of an aromatic dihydroxy compound, such as bisphenol with a diallyl carbonate, such as diphenyl carbonate in the molten state. The transesterification is generally preferred, because it does not use phosgene, which can be toxic, or solvents such as methylene chloride. It is also allows more economic production.

The use of end-capping agents for end-capping polycarbonates polymerized by melt processes has been investigated, to with the goal of improving the hue, heat resistance, and hydrolysis resistance of the polycarbonates. For example, Japanese Patent Application Kokai No. Sho 63-179301 discloses a bisphenol A polycarbonate in which the ends are capped with methyl salicylate. Kokai No. Hei 2-175723 discloses a process for preparing polycarbonate in which the percentage of terminal hydroxyl groups is less than 30% and the limiting viscosity is 0.3 to 1.0 deciliters/gram (dL/g) (20° C. in methylene chloride), by polycondensing an aromatic dihydroxy compound and carbonic acid diester in the presence of phenols having 10 to 40 carbon atoms, for example butylphenol, cumylphenol, and phenylphenol.

It should be noted, however, that even with the use of end-capping agents, the degree of polymerization will not be sufficiently high, and low-molecular-weight polycarbonate and/or polycarbonate with a broad molecular weight distribution will be obtained if the polycondensation reaction has not progressed sufficiently. Furthermore, end-capping efficiency may be poor even if the agent is added after the polycondensation reaction has progressed to the desired point. Thus, the time at which end-capping agent is added and mixing conditions are important factors.

For this reason, Kokai No. Hei 10-36497 discloses an improved process for preparing aromatic polycarbonates by melt polycondensation of an aromatic dihydroxy compound and diphenyl carbonate. An end-capped polycarbonate having an intrinsic viscosity varying no more than 0.1 dL/g is obtained by adding the compound shown in formula (1) below after. the intrinsic viscosity of the polycarbonate has reached at least 0.3 dL/g:

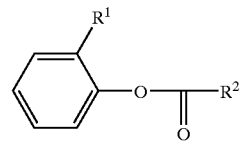

(1)

wherein $R^1$ is a chlorine atom, a methoxycarbonyl group, or an ethoxycarbonyl group; and $R^2$ is an alkyl group having 1 to 30 carbon atoms, an alkoxy group having 1 to 30 carbon atoms, an aryl group having 6 to 30 carbon atoms, or an aryloxy group having 6 to 30 carbon atoms.

International Publication No. WO 98/47938 also proposes adding, and kneading for at least 0.1 seconds, an end-capping agent described by formula (1) above in proportions of 0.3 to 4.0 mol equivalents, based on the hydroxy terminals of the polycarbonate, under conditions of no more than 200–350° C. temperature and no more than 1013 hektopascal (hPa) (760 millimeters of mercury (mmHg)) pressure and then adding, and kneading for at least 0.1 seconds, a stabilizer at a temperature of no more than 200 to 350° C. and pressure of no more than $1.333 \times 10^5$ hPa ($10^5$ mmHg).

Furthermore, Kokai No. Hei 7-90074 discloses an improved process for preparing polycarbonates with an increased degree of polymerization by transesterification of a dihydroxy compound and a carbonic acid diester in which an active diester, acid halide, or acid anhydride having a valance of at least two is added after the transesterification rate has exceeded at least 70%. In Kokai No. Hei 6-1 57739, the present applicant also proposed an improved process for preparing aromatic polycarbonates by melt polycondensation of an aromatic dihydroxy compound and a carbonic acid diester in at least two reactors connected in series, wherein an end-capping agent is added through the inlet port of at least one reactor in which the limiting viscosity of the polymer has reached 0.20 dL/g.

As this patent literature discloses, practitioners of the art have experimented with adding end-capping agents when the polycarbonate reaches a specific limiting viscosity or a specific degree of polymerization. There still remains a need, however, for methods that will yield polycarbonates with the desired molecular weight, polycarbonates that do not decompose (by virtue of having too many terminal hydroxyl groups), and that provide improved end-capping efficiency.

SUMMARY OF INVENTION

Disclosed herein is a process for preparing an end-capped polycarbonate comprising melt reacting an aromatic dihydroxy compound, a carbonic acid diester, and optionally a catalyst in a prepolymerization vessel to form a polycarbonate product; transferring the polycarbonate product from the prepolymerization vessel; mixing the polycarbonate product with an end-capping agent under hermetic seal at a pressure of at least about 760 mm Hg; and transferring the polycarbonate product and end-capping agent mixture to a postpolymerization vessel to endcap the polycarbonate product.

Also disclosed is an apparatus for preparing an end-capped polycarbonate comprising a prepolymerization vessel having and inlet and an outlet; a postpolymerization vessel having an inlet and an outlet; a mixer in fluid communication with the outlet of the prepolymerization vessel and the inlet of the postpolymerization vessel; and a charging port through which an end-capping agent is charged to the mixer, wherein the mixer is hermetically sealed at greater than or equal to 760 mm Hg.

The above described and other features are exemplified by the following figures and detailed description.

BRIEF DESCRIPTION OF DRAWINGS

Referring now to the figures, which are exemplary embodiments, and wherein the like elements are numbered alike:

FIG. 1 is an abbreviated process chart showing an example of one mode of the process for preparing end-capped polycarbonates;

FIG. 2 is a diagonal view of an embodiment of a static mixer; and

FIG. 3 is an abbreviated schematic drawing of an embodiment of a static mixer.

DETAILED DESCRIPTION

The process and apparatus disclosed herein allows efficient preparation of polycarbonates having a high end-capping rate, a high molecular weight, and a low number of hydroxyl terminal groups. In the first stage of the process, the polycarbonate is formed by a melt polycondensation reaction in a prepolymerization vessel, for example a tank. During this prepolymerization stage, during which the polymer has a relatively low intrinsic viscosity, no end-capping agent is present. Following prepolymerization, the polymer is transferred to a postpolymerization vessel, for example a tank. During transfer, the endcapping agent is added and mixed, which prevents volatilization and loss. The transfer is under a hermetic seal and at a pressure of at least 1013 hektopascal (hPa) (760 mmHg). The polycarbonate is subsequently capped in the postpolymerization vessel, during which the polymer has a relatively high limiting viscosity.

As used herein, prepolymerization is the stage at which the polycarbonate is formed (polymerized), and postpolymerization is that stage after which the polycarbonate is formed and during which the polycarbonate end hydroxyl groups are capped. Separation of the process into these two stages allows polymerization to be carried out rapidly and to a sufficient degree in the prepolymerization stage, and to adequately impart the conventional effects of end-capping agents in the postpolymerization stage. The process dramatically increases the degree of polymerization of the resultant polymer. It also produces polycarbonates with enhanced characteristics, such as hue, heat resistance, resistance to thermal aging, moisture resistance, and the like.

Aromatic dihydroxy compounds for the preparation of polycarbonates are known, and include, for example, bisphenol compounds described by formula (2) below:

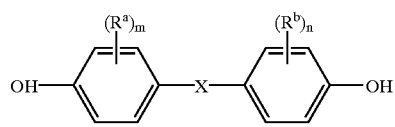

(2)

wherein $R^a$ and $R^b$ are each a halogen atom or a monovalent hydrocarbon group and may be identical or different; and m and n are integers from 0 to 4; X is —C($R^c$)($R^d$)—, —C($R^e$)—, —O—, C(O)—, —S—, —SO—, —SO$_2$—, or

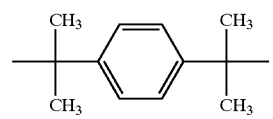

wherein $R^c$ and $R^d$ are each a hydrogen atom or a monovalent hydrocarbon group; $R^c$ and $R^d$ may form a cyclic structure; and $R^e$ is a bivalent hydrocarbon group.

Specific examples of aromatic dihydroxy compounds represented by formula (2) include, but are not limited to, bis(hydroxyaryl)alkanes such as bis(4-hydroxyphenyl) methane, 1,1-bis(4-hydroxyphenyl)ethane, 2,2-bis(4-hydroxyphenyl)propane ("bisphenol A"), 2,2-bis(4-hydroxyphenyl)butane, 2,2-bis(4-hydroxyphenyl)octane, (bis(4-hydroxyphenyl)phenylmethane, 2,2-bis(4-hydroxy-1-methylphenyl)propane, 1,1-bis(4-hydroxy-t-butylphenyl) propane, 2,2-bis(4-hydroxy-3-bromophenyl) propane, and 2,2-(4-hydroxy-3,5-dibromophenyl)propane; bis (hydroxyaryl) cycloalkanes, such as 1,1-bis(4-hydroxyphenyl)cyclopentane and 1,1-(4-hydroxyphenyl) cyclohexane; dihydroxyarylethers, such as 4,4'-dihydroxydiphenylether and 4,4'-dihydroxy-3,3'-dimethylphenylether; dihydroxydiarylsulfides, such as 4,4'-dihydroxydiphenylsulfide and 4,4-dihydroxy-3,3'-dimethylphenylsulfide; dihydroxydiarylsulfoxides, such as 4,4'-dihydroxydiphenylsulfoxide and 4,4'-dihydroxy-3,3'-dimethyidiphenylsulfoxide; and dihydroxydiarylsulfones, such as 4,4'-dihydroxydiphenylsulfone and 4,4'-dihydroxy-3,3'-dimethyldiphenylsulfone. Especially preferred is bisphenol A.

In addition to the aromatic dihydroxy compounds described by formula (2) above, aromatic dihydroxy compounds described by formula (3) below may also be used:

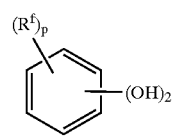

(3)

wherein $R^f$ is respectively and independently a hydrocarbon group having 1 to 10 carbon atoms, at least one of which is a halogenated hydrocarbon substituted with a halogen atom, or at least one of which is a halogen atom; and p is an integer from 0 to 4.

Specific examples of aromatic dihydroxy compounds described by formula (3) include resorcinol and substituted resorcinols, such as 3-methylresorcinol, 3-ethylresorcinol, 3-propylresorcinal, 3-butylresorcinol, 3-t-butylresorcinol, 3-phenylresorcinol, 3-cumylresorcinol, 2,3,4,6-tetrafluororesorcinol, and 2,3,4,6-tetrabromoresorcinol; catechol; hydroquinone and substituted hydroquinones, such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, and 2,3,5,6-tetrabromohydroquinone.

In addition to the aromatic dihydroxy compounds in formulas (2) and (3) above, 2,2,2',2'-tetrahydro-3,3,3',3'-tetramethyl-1,1'-spirobi-[1H-indene]-7,7-diol described by formula (4) below may also be used:

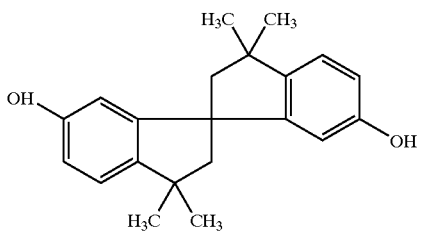

(4)

The aromatic dihydroxy compounds represented by formulas (2) to (4) may be used singly or in combinations of two or more.

Additionally, a melt polycondensation catalyst may be added to the aromatic dihydroxy compound and the carbonic acid diester separately or after the dihydroxy compound and the carbonic acid diester have been mixed. The melt polycondensation catalyst may comprise alkali metal compounds and/or alkaline earth metal compounds (a) (also referred to as alkali (earth) metal compounds (a) herein).

Preferred examples of alkali (earth) metal compounds (a) include organic acid salts, inorganic acid salts, oxides, hydroxides, hydrides, and alcoholates of alkali metals and alkaline earth metals. These compounds may be used in combinations of two or more.

Specific examples of alkali metal compounds include sodium hydroxide; potassium hydroxide; lithium hydroxide; sodium bicarbonate; potassium bicarbonate; lithium bicarbonate; sodium carbonate; potassium carbonate; lithium carbonate; sodium acetate; potassium acetate; lithium acetate; sodium stearate; potassium stearate; lithium stearate; sodium borohydride; lithium borohydride; sodium borophenylate; sodium benzoate; potassium benzoate; lithium benzoate; disodium hydrogenphosphate; dipotassium hydrogenphosphate; dilithium hydrogenphosphate; the disodium, dipotassium, and dilithium salts of bisphenol A; and the sodium, potassium, and lithium salts of phenols.

Specific examples of alkaline earth metal compounds include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

The melt polycondensation catalyst may further comprise a basic compound (b) that may be used in combination with the alkali (earth) metal compounds (a). Examples of basic compounds (b) include nitrogen containing basic compounds that readily decompose, or that are readily volatile at high temperatures. Specific examples may include ammonium hydroxides containing an alkyl, aryl, alaryl group, or the like, such as tetramethylammonium hydroxide ($Me_4$ NOH), tetraethylammonium hydroxide ($Et_4NOH$), tetrabutylammonium hydroxide ($Bu_4$ NOH), and trimethylbenzylammonium hydroxide ($\phi$—$CH_2$ $(Me)_3NOH$, where $\phi$ is a phenyl group); tertiary amines, such as trimethylamine, triethylamine, dimethylbenzylamine, and triphenylamine; secondary amines described by $R_2NH$ (where R is, for example, an alkyl group, such as methyl or ethyl, or an aryl group, such as phenyl or tolyl); primary amines described by $RNH_2$(where R is, for example, an alkyl group, such as methyl or ethyl, or an aryl group, such as phenyl or tolyl); pyridines, such as 4-dimethylaminopyridine, 4-diethylaminopyridine, and 4-pyrrolidinopyridine; imidazoles, such as 2-methylimidazole and 2-phenylimidazole; and basic salts, such as ammonia, tetramethylammonium borohydride ($Me_4NBH_4$), tetrabutylammonium borohydride ($Bu_4NBH_4$), tetrabutylammonium tetraphenylborate ($Bu_4NBPh_4$), and tetramethylammonium tetraphenylborate ($Me_4NBPh_4$). Of these, tetraalkylammonium hydroxides are preferred.

The melt polycondensation catalyst may further comprise boric acid compounds (c) including, for example, boric acid and boric acid esters. Examples of boric acid esters may include, for example, those described by the general formula:

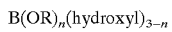

wherein R is an alkyl, such as methyl or ethyl, or an aryl, such as phenyl; and n is an integer from 1 to 3. Specific examples of boric acid esters include trimethyl borate, triethyl borate, tributyl borate, trihexyl borate, triheptyl borate, triphenyl borate, tritolyl borate, and trinaphthyl borate.

Preferably the melt polycondensation catalyst is a combination of alkali (earth) metal compounds (a) and nitrogen-containing basic compounds (b), with a combination of the three classes of compounds alkali (earth) metal compounds (a), nitrogen-containing basic compounds (b), and boric acid or boric acid ester (c) more preferred. When a combination of alkali (earth) metal compounds (a) and nitrogen-containing basic compounds (b), or a combination of alkali (earth) metal compounds (a), nitrogen-containing basic compounds (b), and boric acid compounds (c) is used, the respective catalytic components may be added as a mixture to the molten mixture of bisphenol and carbonic acid diester or they may be added individually to the molten mixture of bisphenol and carbonic acid diester.

The end-capping agents used in the formation of the end-capped polycarbonate may include carbonate compounds, carboxylic acid esters, epoxy compounds, and combinations of the foregoing, with the use of carbonate compounds and/or carboxylic acid ester compounds preferred. The carbonate compounds and/or carboxylic acid ester compounds may be described by formula (I) below:

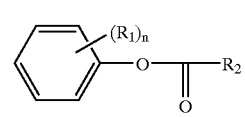

(I)

wherein $R_1$ is an electron-attractive group selected from the group consisting of halogen atoms, nitro groups, and alkoxycarbonyl groups having 1 to 30 carbon atoms, and wherein $R_1$ may be linked to any position of the benzene ring with linkage at the o-position preferred; $R_2$ is an alkyl group having 1 to 30 carbon atoms, an alkoxy group with 1 to 30 carbon atoms, an aryl group having 6 to 30 carbon atoms, or an aryloxy group having 6 to 30 carbon atoms; and n is an integer from 1 to 3.

Specific examples of end-capping agents described by formula (I) include 2-chlorophenyl aryl carbonates, such as 2-chlorophenyl phenyl carbonate, 2-chlorophenyl 4'-methylphenyl carbonate, 2-chlorophenyl 4'-ethylphenyl carbonate, 2-chlorophenyl 4'-n-butylphenyl carbonate, 2-clorophenyl 4'-t-butylphenyl carbonate, 2-chlorophenyl 4'-nonylphenyl carbonate, 2-chlorophenyl 4'-cumyl carbonate, 2-chlorophenyl naphthyl carbonate, 2-chlorophenyl 4'-methoxyphenyl carbonate, 2-chlorophenyl 4'-ethoxyphenyl carbonate, 2-chlorophenyl 4'-n-butoxyphenyl carbonate, 2-chlorophenyl 4'-t-butoxyphenyl carbonate, 2-chlorophenyl 4'-nonyloxyphenyl carbonate, 2-chlorophenyl 4'-t-propyloxyphenyl carbonate, 2-chlorophenyl 2'-methoxycarbonylphenyl carbonate, 2-chlorophenyl 4'-methoxycarbonylphenyl carbonate, 2-chlorophenyl 2'-ethoxycarbonylphenyl carbonate, 2-chlorophenyl 4'-ethoxycarbonylphenyl carbonate, 2-chlorophenyl 2'-(o-methoxycarbonylphenyl) oxycarbonylphenyl carbonate, and 2-chlorophenyl 2'-(o-ethoxycarbonylphenyl)oxycarbonylphenyl carbonate; 2-chlorophenyl alkyl carbonates, such as 2-chlorophenyl methyl carbonate, 2-chlorophenyl ethyl carbonate, 2-chlorophenyl n-butyl carbonate, 2-chlorophenyl octyl carbonate, 2-chlorophenyl j-propyl carbonate, 2-chlorophenyl 2-methoxycarbonylethyl carbonate, 2-chlorophenyl 2-ethoxycarbonylethyl carbonate, and 2-chlorophenyl 2-(o-ethoxycarbonylphenyl) oxycarbonylethyl carbonate; 2-methoxy carbonyl phenyl aryl carbonates, such as 2-methoxycarbonylphenyl phenyl carbonate, 2-methoxycarbonylphenyl methylphenyl carbonate, 2-methoxycarbonylphenyl ethylphenyl carbonate, 2-methoxycarbonylphenyl propylphenyl carbonate, 2-methoxycarbonylphenyl n-butylphenyl carbonate, 2-methoxycarbonylphenyl t-butylphenyl carbonate, 2-methoxycarbonylphenyl hexylphenyl carbonate, 2-methoxycarbonylphenyl nonylphenyl carbonate, 2-methoxycarbonylphenyl dodecylphenyl carbonate, 2-methoxycarbonylphenyl hexadecylphenyl carbonate, 2-methoxycarbonylphenyl di-n-butylphenyl carbonate, 2-methoxycarbonylphenyl di-t-butylphenyl carbonate, 2-methoxycarbonylphenyl dinonylphenyl carbonate, 2-methoxycarbonylphenyl cyclohexylphenyl carbonate, 2-methoxycarbonylphenyl naphthylphenyl carbonate, 2-methyoxycarbonylphenyl biphenyl carbonate, 2-methoxycarbonylphenyl cumylphenyl carbonate, 2-methoxycarbonylphenyl 4'-methoxyphenyl carbonate, 2-methoxycarbonylphenyl 4'-ethoxyphenyl carbonate, 2-methoxycarbonylphenyl 4'-n-butoxyphenyl carbonate, 2-methoxycarbonylphenyl 4'-t-butoxyphenyl carbonate, 2-methoxycarbonyl phenyl 4'-nonyloxyphenyl carbonate, 2-methoxycarbonylphenyl 4'-cumyloxyphenyl carbonate, di-(2-methoxycarbonylphenyl) carbonate, 2-methoxycarbonylphenyl 4'-methoxycarbonylphenyl carbonate, 2-methoxycarbonylphenyl 2'-ethoxycarbonylphenyl carbonate, 2-methoxycarbonylphenyl 4'-ethoxycarbonylphenyl carbonate, 2-methoxycarbonylphenyl 2'-(o-methoxycarbonylphenyl)oxycarbonylphenyl carbonate, and 2-methoxycarbonylphenyl 2'-(o-ethoxycarbonylphenyl)oxycarbonylphenyl carbonate; 2-methoxycarbonylphenyl alkyl carbonates, such as 2-methoxycarbonylphenyl methyl carbonate, 2-methoxycarbonylphenyl ethyl carbonate, 2-methoxycarbonylphenyl n-butyl carbonate, 2-methoxycarbonylphenyl octyl carbonate, 2-methoxycarbonylphenyl nonyl carbonate, 2-methoxycarbonylphenyl cetyl carbonate, 2-methoxycarbonylphenyl lauryi carbonate, 2-methoxycarbonylphenyl 2-methoxycarbonylethyl carbonate, 2-methoxycarbonylphenyl 2-ethoxycarbonylethyl carbonate, 2-methoxycarbonylphenyl 2-(o-methoxycarbonylphenyl) oxycarbonylethyl carbonate, and 2-methoxycarbonylphenyl 2-(o-ethoxycarbonylphenyl)oxycarbonylethyl carbonate; 2-ethoxycarbonylphenyl aryl carbonates such as 2-ethoxycarbonylphenyl phenyl carbonate, 2-ethoxycarbonylphenyl methylphenyl carbonate, 2-ethoxycarbonylphenyl ethylphenyl carbonate, 2-ethoxycarbonylphenyl propylphenyl carbonate, 2-ethoxycarbonylphenyl n-butylphenyl carbonate, 2-ethoxycarbonylphenyl t-butylphenyl carbonate, 2-ethoxycarbonylphenyl hexylphenyl carbonate, 2-ethoxycarbonylphenyl nonylphenyl carbonate, 2-ethoxycarbonylphenyl dodecylphenyl carbonate, 2-ethoxycarbonylphenyl hexadecylphenyl carbonate, 2-ethoxycarbonylphenyl di-n-butylphenyl carbonate, 2-ethoxycarbonylphenyl di-t-butylphenyl carbonate, 2-ethoxycarbonylphenyl di-t-butylphenyl carbonate, 2-ethoxycarbonylphenyl dinonylphenyl carbonate, 2-ethoxycarbonylphenyl cyclohexylphenyl carbonate, 2-ethoxycarbonylphenyl napthylphenyl carbonate, 2-ethoxycarbonylphenyl biphenyl carbonate, 2-ethoxycarbonylphenyl cumylphenyl carbonate, 2-ethoxycarbonylphenyl 4'-methoxyphenyl carbonate, 2-ethoxycarbonylphenyl 4'-ethoxyphenyl carbonate, 2-ethoxycarbonylphenyl 4'-n-butoxyphenyl carbonate, 2-ethoxycarbonylphenyl 4'-t-butoxyphenyl carbonate, 2-ethoxycarbonylphenyl 4'-nonyloxyphenyl carbonate, 2-ethoxycarbonylphenyl 4'-cumyloxyphenyl carbonate, di-(2-ethoxycarbonylphenyl) carbonate, 2-ethoxycarbonylphenyl 4'-methoxycarbonylphenyl carbonate, 2-ethoxycarbonylphenyl 4'-ethoxycarbonylpheyl carbonate, 2-ethoxycarbonylphenyl 2'-(o-methoxycarbonylphenyl)oxycarbonylphenyl carbonate, and 2-ethoxycarbonylphenyl 2'-(o-ethoxycarbonylphenyl) oxycarbonylphenyl carbonate; 2-ethoxycarbonylphenyl alkyl carbonates, such as 2-ethoxycarbonylphenyl methyl carbonate, 2-ethoxycarbonylphenyl ethyl carbonate, 2-ethoxycarbonylphenyl n-butyl carbonate, 2-ethoxycarbonylphenyl octyl carbonate, 2-ethoxycarbonylphenyl 2-methoxycarbonylethyl carbonate, 2-ethoxycarbonylphenyl 2-ethoxycarbonylethyl carbonate, 2-ethoxycarbonylphenyl 2-(o-methoxycarbonylphenyl)oxycarbonylethyl carbonate, and 2-ethoxycarbonylphenyl 2-(o-ethoxycarbonylphenyl) oxycarbonylethyl carbonate; 2-propoxycarbonylphenyl aryl carbonates; 2-propoxycarbonylphenyl alkyl carbonates; 2-butyoxycarbonylphenyl aryl carbonates; 2-butoxycarbonylphenyl alkyl carbonates; 2-phenoxycarbonylphenyl aryl carbonates; and 2-phenoxycarbonylphenyl alkyl carbonates.

End-capping agents described by formula (I) may also include aromatic carboxylic acid 2-chlorophenyl esters, such as 2-chlorophenyl benzoate, 2-chlorophenyl 4-methylbenzoate, 2-chlorophenyl 4-ethylbenzoate, 2-chlorophenyl 4-n-butylbenzoate, 2-chlorophenyl 4-t-butylbenzoate, 2-chlorophenyl 4-nonylbenzoate, 2-chlorophenyl 4-cumylbenzoate, 2-chlorophenyl naphthoate, 2-chlorophenyl 4-methoxybenzoate, 2-chlorophenyl 4-ethoxybenzoate, 2-chlorophenyl 4-n-butoxybenzoate, 2-chlorophenyl 4-t-butoxybenzoate, 2-chlorophenyl 4-nonyloxybenzoate, 2-chlorophenyl 4-cumyloxybenzoate, 2-chlorophenyl 2-methoxycarbonylbenzoate, 2-chlorophenyl 4-methoxycarbonylbenzoate, 2-chlorophenyl 2-ethoxycarbonylbenzoate, 2-chlorophenyl 4-ethoxycarbonylbenzoate, 2-chlorophenyl 2-(o-methoxycarbonylphenyl)oxycarbonylbenzoate, and 2-chlorophenyl 2-(o-ethoxycarbonylphenyl) oxycarbonylbenzoate; aliphatic carboxylic acid 2-chlorophenyl esters, such as 2-chlorophenyl acetate, 2-chlorophenyl propionate, 2-chlorophenyl valerate, 2-chorophenyl pelargonate, 2-chlorophenyl 1-methylpropionate, 2-chlorophenyl 2-methoxycarbonylpropionate, 2-chlorophenyl 2-ethoxycarbonylbutyrate, 2-chlorophenyl 4'-(2-methoxycarbonylphenyl)oxycarbonyl butyrate, and 2-chlorophenyl 4'-(2-methoxycarbonylphenyl)oxycarbonyl butyrate; aromatic carboxylic acid (2'-methoxycarbonylphenyl)esters, such as (2-methoxylcarbonylphenyl)benzoate, 4-methylbenzoyl-(2'-methoxycarbonylphenyl) ester, 4-ethylbenzoyl-(2'-methoxycarbonylphenyl)ester [sic], 4-n-butylbenzoyl-(2'-methoxycarbonyl)ester [sic], 4-t-butylbenzoyl-2'-methoxycarbonylphenyl)ester, (2'-methoxycarbonylphenyl) naphthoate, (2'-methoxycarbonylphenyl) 4-nonylbenzoate, (2'-methoxycarbonylphenyl) 4-cumylbenzoate, (2'-methoxycarbonylphenyl) 4-methoxybenzoate, (2'-methoxycarbonylphenyl) 4-ethoxybenzoate, (2'-methoxycarbonylphenyl) 4-n-butoxybenzoate, (2'-methoxycarbonylphenyl) 4-t-butoxybenzoate, (2'-methoxycarbonylphenyl) 4-cumyloxybenzoate, (2'-methoxycarbonylphenyl) 2-methoxycarbonylbenzoate, (2'-methoxycarbonylphenyl) 4-methoxycarbonylbenzoate, (2'-methoxycarbonylphenyl) 4-ethoxycarbonylbenzoate, (2'-methoxycarbonylphenyl) 3-(o-methoxycarbonylphenyl) oxycarbonylbenzoate, (2'-methoxycarbonylester) 4-(o-methoxycarbonylphenyl)oxycarbonylbenzoate, and (2'-methoxycarbonylphenyl) 3-(o-ethoxycarbonylphenyl) oxycarbonylbenzoate; aliphatic carboxylic acid (2'-methoxycarbonylphenyl)esters such as (2'-methoxycarbonylphenyl)stearate; aromatic carboxylic acid (2'-ethoxycarbonylphenyl)esters, such as (2'-ethoxycarbonylphenyl)benzoate, 4-methyl benzoyl -(2'-ethoxycarbonylphenyl)ester [sic], 4-ethylbenzoyl-(2'-ethoxycarbonylphenyl)ester [sic], 4-n-butylbenzoyl (2'-ethoxycarbonylphenyl)ester [sic], 4-t-butylbenzoyl (2'-ethoxycarbonylphenyl)ester, (2'-ethoxycarbonylphenyl) naphthoate, (2'-ethoxycarbonylphenyl) 4-nonylbenzoate, (2'-ethoxycarbonylphenyl) 4-cumylbenzoate, (2'-ethoxycarbonylphenyl) 4-methoxybenzoate, (2'-ethoxycarbonylphenyl) 4-ethoxybenzoate, (2'-ethoxycarbonylphenyl) 4-n-butoxybenzoate, (2'-ethoxycarbonylphenyl) 4-t-butoxybenzoate, (2'-ethoxycarbonylphenyl) 4-nonyloxybenzoate, (2'-ethoxycarbonylphenyl) 4-cumyloxybenzoate, (2'-ethoxycarbonylphenyl) 2-methoxycarbonylbenzoate, (2'-ethoxycarbonylphenyl) 4-ethoxycarbonylbenzoate, (2'-ethoxycarbonylphenyl) 3-(o-methoxycarbonyl) oxycarbonylbenzoate, (2'-ethoxycarbonylphenyl) 4(o-methoxycarbonylphenyl)oxycarbonylbenzoate, and (2'-ethoxycarbonylphenyl) 3-o-methoxycarbonylphenyloxycarbonylbenzoate; aliphatic carboxylic acid (2'-ethoxycarbonylphenyl)esters such as (2'-ethoxycarbonylphenyl)stearate; aromatic carboxylic acid (2-propoxycarbonylphenyl)esters; aliphatic carboxylic acid (2'-propoxycarbonylphenyl)esters; aromatic carboxylic acid (2'-butoxycarbonylphenyl)esters; aliphatic carboxylic (2-butoxycarbonylphenyl)esters; aromatic carboxylic (2'-phenoxycarbonylphenyl)esters; and aliphatic carboxylic acid (2-phenoxycarbonylphenyl)esters.

In addition, carbonate compounds and/or carboxylic acid ester compounds described by formula (II) below can also be used as end-capping agents:

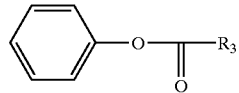

(II)

wherein $R_3$ is an alkyl group having 1 to 30 carbon atoms, an alkoxyl group having 1 to 30 carbon atoms, an aryl group having 6 to 30 carbon atoms, or an aryloxy group having 6 to 30 carbon atoms. When $R_3$ is an aryloxy group having 6 to 30 carbon atoms, the compound does not contain an electron-attractive group, such as halogen atoms, nitro groups, or alkoxycarbonyls.

Specific examples of end-capping agents described by formula (II) include phenyl aryl carbonates, such as diphenyl carbonate, phenyl 4'-methylphenyl carbonate, phenyl 4'-ethylphenyl carbonate, phenyl 4'-n-butylphenyl carbonate, phenyl 4'-t-butylphenyl carbonate, phenyl 4'-nonylphenyl carbonate, phenyl 4'-cumyl carbonate, phenyl naphthyl carbonate, phenyl 4'-methoxyphenyl carbonate, phenyl 4'-ethoxyphenyl carbonate, phenyl 4'-n-butoxyphenyl carbonate, phenyl 4'-t-butoxyphenyl carbonate, phenyl 4'-nonyloxyphenyl carbonate, and phenyl 4'-t-propyloxyphenyl carbonate; and phenyl alkyl carbonates, such as phenyl methyl carbonate, phenyl ethyl carbonate, phenyl n-butyl carbonate, phenyl octyl carbonate, and phenyl i-propyl carbonate.

Further examples of compounds described by formula (11) that can be used as end-capping agents include aromatic carboxylic acid phenyl esters, such as phenyl benzoate, phenyl 4-methylbenzoate, phenyl 4-ethylbenzoate, phenyl 4-n-butylbenzoate, phenyl 4-t-butylbenzoate, phenyl 4-nonylbenzoate, phenyl 4-cumylbenzoate, phenyl napthoate 4-phenyl methoxybenzoate, phenyl 4-ethoxybenzoate, phenyl 4-n-butoxybenzoate, phenyl 4-t-butoxybenzoate, phenyl 4-nonyloxybenzoate, and phenyl 4-cumyloxybenzoate; and aliphatic carboxylic acid phenyl esters, such as phenyl acetate, phenyl propionate, phenyl valerate, phenyl pelargonate, phenyl 1-methylproprionate, and phenyl stearate.

An exemplary process and apparatus is shown in FIG. 1, the apparatus having a feed stock agitator tank 1, feed stock drums 2a and 2b, pipes 3a, 3b, 3c, and 6, prepolymerization vessels 4a and 4b, venting pipes 5a, 5b, and 5c, end-capping agent drum 7, static mixer 8, and postpolymerization vessel 9. In the process, feed stocks for polycarbonate polycondensation are mixed in feed stock agitator tank 1. Agitator tank 1 has an agitator blade on a vertical revolving shaft. Feed stock drums 2a and 2b are filled with the aromatic dihydroxy compound and the carbonic acid diester, respectively. The aromatic dihydroxy compound and the carbonic acid diester are continuously fed from feed stock drums 2a and 2b through pipes 3a and 3b, respectively, to feed stock agitator tank 1. As it is preferred that substantially no oxygen be present in the atmosphere of agitator tank 1, the agitator tank 1 may be purged with nitrogen gas. Plural agitator tanks 1 can be arranged in series in order to form a uniform solution comprising the aromatic dihydroxy compound and the carbonic acid diester.

A melt polycondensation catalyst may be added to either agitator tank 1 by a pump (not shown) or to either or both feed stock drums 2a and 2b in which case the melt polycondensation catalyst would also be continuously fed from feed stock drums 2a and/or 2b through pipes 3a and/or 3b. It is preferred that the alkali (earth) metal compounds (a) be included in the melt polycondensation reaction in amounts of $1 \times 10^{-8}$ to $1 \times 10^{-3}$ mole, preferably $1 \times 10^{-7}$ to $2 \times 10^{-6}$ mole, and more preferably $1 \times 10^{-7}$ to $8 \times 10^{-7}$ mole, per mole of bisphenol. If an alkali (earth) metal compound (a) is already present in the bisphenol feed stock for the polycondensation reaction, it is preferable to limit the amount of alkali (earth) metal compound (a) added so that the amount present in the polycondensation reaction per mole of bisphenol will be within the above-stated range. Where nitrogen-containing basic compounds (b) are combined with alkali (earth) metal compounds (a), the nitrogen-containing basic compounds (b) may be used in amounts of $1\times10^{-6}$ to $1\times10^{-1}$ mole per mole of bisphenol, with $10\times10^{-5}$ to $10\times10^{-2}$ mole per mole of bisphenol preferred. These amounts are preferred as they allow the polycondensation reaction to progress at a sufficient speed and with a high level of polymerization activity resulting in the production of a high-molecular-weight polycarbonate product. The boric acid compounds (c) may be used in amounts of $1\times10^{-8}$ to $1\times10^{-1}$ mole, with $1\times10^{-7}$ to $1\times10^{-2}$ mole preferred, and with $10\times10^{-6}$ to $1\times10^{-4}$ mole especially preferred, where mole is mole of boric acid or boric acid esters per mole of bisphenol.

Still referring to FIG. 1, the initial melt polycondensation of the mixed feed stocks begins by feeding the mixed feed stocks by a pump (not shown) through pipe 3c to prepolymerization vessels 4a and 4b. The prepolymerization vessels 4a and 4b are provided with mixing blades having vertical shafts. Reduced pressure is maintained by means of venting pipes 5a and 5b provided in the top part of the prepolymerization vessels 4a and 4b. Byproduct phenol and a portion of the unreacted monomers may be fractionated, the phenol removed from the system, and the unreacted monomers returned to the prepolymerization vessels 4a and 4b. Melt polycondensation catalysts can also be fed to the prepolymerization vessels 4a and 4b. Multistage prepolymerization vessels 4a and 4b, consisting of two or more stages, may be used, as shown in FIG. 1, or a single-stage prepolymerization vessel may be used. However, two to four stages are preferred.

In the first prepolymerization vessel 4a, the reaction temperature is preferably 50 to 270° C., with 150 to 260° C. preferred. The pressure may be reduced from atmospheric pressure to 6 mmHg (8 millibars (mbar)), with 400 to 6 mmHg (0.53 to 8 mbar) preferred, and with 300 to 6 mmHg (0.40 to 8 mbar) especially preferred. In the second prepolymerization vessel 4b, the reaction temperature is usually 180 to 300° C., with 200 to 280° C. preferred. The pressure can be 1 to 50 mmHg, with 1 to 30 mmHg preferred. When there are multiple stages numbering more than two, the pressure is preferably reduced and the temperature elevated in each successive stage within the above-described ranges.

The aromatic polycarbonate reaction product in the prepolymerization vessels 4a and 4b has a limiting viscosity [η] (20° C. in methylene chloride) of 0.05 to 0.5 dL/g, with 0.10 to 0.45 dL/g preferred, and with 0.10 to 0.4 dL/g more preferred. After reaching a desired viscosity, the polycarbonate removed from the prepolymerization vessel(s) and ultimately fed to postpolymerization vessel 9. However, prior to reaching the postpolymerization vessel 9, the polycarbonate is mixed with an end-capping agent. Such mixing may occur in a separate vessel (not shown), but most conveniently occurs in piping 6 connecting the pre- and post-polymerization vessels.

As shown in FIG. 1, the end-capping agent is preferably introduced through piping 3c by a pump (not shown) into piping 6, wherein the end-capping agent and polycarbonate product are mixed. These end-capping agents are preheated in a conventional feed stock drum 7 at a temperature of 120 to 200° C. and introduced into piping 6 through piping 3c. End-capping agents such as those mentioned herein are used in proportions of preferably 0.5 to 2.0 moles, with 0.7 to 1.5 moles more preferred and 0.8 to 1.2 moles being especially preferred, per equivalent of polycarbonate terminal hydroxyl groups.

For mixing the end-capping agent and polycarbonate, it is preferred to provide a static mixer such as that shown in FIG. 2 inside piping 6 as shown in FIG. 1. Two or more static mixers may be arranged in series. Examples of static mixers that may be used are described in, for example, Kokai No. Hei 5-131126 and Japanese Patent Office Tokuhyo No. Hei 9-506318. FIG. 2 is a diagonal view of a preferred static mixer 10. This static mixer 10 comprises a first guide plate array 11 and a second guide plate array 12.

As shown in FIG. 2, the first guide plate array 11 has at least two triangular first guide plates arranged circumferentially. The first guide plates are positioned at the upstream end of the static mixer 10 with respect to the direction of fluid flow. Additionally, the first guide plates respectively incline from their bottom part where they are securely attached to the inner wall of piping 6 (not shown) to an apex at the downstream end where they are connected near the central axis of piping 6 (not shown). The second guide plate array 12 has the same number of triangular second guide plates as the first guide plate array 11. The second guide plates incline respectively from an apex near the central axis where they are connected on the inside. of the first guide plate array 11 toward their bottom part where they are securely attached to the inner wall of piping 6 (not shown) at their downstream end. Additionally, the second guide plates 12 are spaced circumferentially so that they are located between the first guide array 11.

When the polycarbonate product and the end-capping agent flowing through the piping 6 (not shown) pass through the static mixer 10, the peripheral portion of the polycarbonate product and end-capping agent flowing near the inner wall of the piping 6 (not shown) is guided from the peripheral area toward the area of the central axis by the respective inclined first guide plate array 11. Meanwhile, the central portion of the polycarbonate product and the end-capping agent flowing through the central portion of the pipe 6 (not shown) is guided from the area of the central axis to the peripheral area by the respective inclined second guide plate array 12. Thus, the polycarbonate product and the end-capping agent flowing through the pipe 6 (not shown), are mixed by switching the places of the circumferential and central portions of the flow.

The static mixer, however, is not limited to that illustrated in FIG. 2. It may also be, for example, one such as that shown in FIG. 3. The static mixer illustrated in FIG. 3 comprises two types of mixing elements 21 and 22 that mix the polycarbonate product and the end-capping agent. Mixing element 21, a rectangular plate twisted 180°, is a mixing element that splits the fluid into two and imparts a rightward rotation to the fluid (e.g., causes the fluid to rotate in a rightward manner around the central axis of piping 6). Mixing element 22, which is twisted 180° in the opposite direction of mixing element 21, is a mixing element that splits the fluid into two and imparts a leftward rotation to the fluid (e.g., causes the fluid to rotate in a leftward manner around the central axis of piping 6). The mixing element 21 for rightward rotation, and mixing element 22 for leftward rotation are provided in an alternating arrangement, and they are arranged in such a way that each is rotated 90° with respect to the previous element. With this static mixer, the polycarbonate product and end-capping agent fluid is split into two and twisted to the right by mixing element 21, for rightward rotation and split into two and twisted to the left by mixing element 22 for leftward rotation. The fluid is thus mixed by the repetition of these splitting and twisting actions.

Another preferred mixer for mixing the polycarbonate product and end-capping agent includes a hermetically sealed mixing drum, which may be provided midway in piping connecting the prepolymerization vessel with the postpolymerization vessel. The hermetically sealed state controls evaporation and vaporization of the end-capping agent, thereby resulting in a more efficient use of the end-capping agent. In addition, it is possible to manufacture polycarbonates having higher molecular weights with lower numbers of hydroxyl end groups, e.g., molecular weights of about 8,820 to 9,540 and hydroxyl end groups of about 505 parts per million (ppm) to about 610 ppm. The time for which the end-capping agent and the polycarbonate product are mixed prior to the postpolymerization vessel is preferably determined based on the reactivity and physical properties of the end-capping agent. Specifically, when the end-capping agent is a carbonate compound and/or carboxylic acid ester compound, as shown in formula (I), that boils in the postpolymerization vessel (for example 2-methoxycarbonylphenyl phenyl carbonate and 2-ethoxycarbonylphenyl phenyl carbonate, which boil at temperatures of at least 240° C. and at pressures of 20 mm Hg or less) the mixing time is no less than 30 seconds to no more than 10 minutes, with 1 to 7 minutes preferred. Under these conditions, when an end-capping agent in formula (I), which reacts comparatively quickly and readily with the hydroxyl end groups of the polycarbonate is used, the end-capping reaction progresses smoothly. The reaction results in a high molecular weight polycarbonate, as a decrease in the molecular weight of the polycarbonate caused by excessive reaction (transesterification) is controlled. Additionally, under these reactions, the end-capping agent is mixed with the resin with suitable uniformity, and there is little loss of the added end-capping agent under the high-temperature, high-vacuum conditions of the postpolymerization vessel 9.

When the end-capping agent is a carbonate compound and/or carboxylic acid ester compound, as shown in formula (II), that boils in the postpolymerization vessel, (for example diphenyl carbonate and phenyl p-cumyl carbonate) the mixing time in piping 6 is at least 10 minutes, with 15 to 60 minutes preferred. Thus, the reaction between the end-capping agent represented by formula (II), wherein the end-capping agent does not have electron-attractive groups, is slower than with an end-capping agent represented by, for example, formula (I). Under these conditions, the end-capping reaction progresses smoothly because sufficient residence time is provided, and the end-capping agent is uniformly mixed with the polycarbonate. As a result, a dramatic decrease in molecular weight does not occur, there is a suitable degree of reaction between the end-capping agent and the terminal hydroxyl groups, and there is no loss of the added end-capping agent in the high-temperature, high-vacuum conditions of the postpolymerization vessel.

As shown in FIG. 1, after the end-capping agent is mixed with the polycarbonate product, the mixture is fed to the postpolymerization vessel 9. The reaction temperature in postpolymerization vessel 9 is usually 320° C., with 250 to 310° C. preferred, and the pressure is no more than 20 mmHg, with no more than 10 mmHg preferred. The terminal hydroxyl groups of the polycarbonate product and the end-capping agent are reacted, and the ends of the polycarbonate are capped in postpolymerization vessel 9 to form an end-capped polycarbonate. Preferably, resultant phenols and other byproducts are distilled off by means of venting pipe 5c provided in postpolymerization vessel 9, so that the end-capping can be performed rapidly and at a high level of efficiency.

After the formation of the end-capped polycarbonate, the now viscous end-capped polycarbonate is removed from the bottom part of the prepolymerization vessel by, for example, a gear pump. The end-capped polycarbonate preferably has a limiting viscosity [$\eta$] measured at 20° C. in methylene chloride from 0.20 to 1.0 dL/g, with 0.25 to 0.9 dL/g preferred, and with 0.30 to 0.8 dL/g more preferred.

The end-capped polycarbonate is usually then extruded and pelletized. As desired, it is also permissible to add and knead in phosphorous acid (B), a sulfur-containing acidic compound with a pKa value of 3 or less or a derivative thereof (C), an ester-group-containing alcohol compound (D), and/or water (E). Phosphorous acid (B) may be in the form of a salt such as a sodium or potassium salt. Such a phosphorous acid (B) should be blended in amounts of 0.1 to 10 ppm, with 0.2 to 5 ppm preferred, based on the end-capped polycarbonate composition (A).

Examples of sulfur-containing acidic compounds (C) with a pKa value of 3 or less or a derivative thereof (referred to as "acidic compound (C)" below) include sulfurous acid, sulfuric acid, sulfinic acid compounds, sulfonic acid compounds, and derivatives thereof. Ester-group-containing alcohol compounds (G) are partial esters derived from monovalent fatty acids having 10 to 22 carbon atoms and polyhydric alcohols. Examples include partial esters derived from monovalent fatty acids having 10 to 22 carbon atoms, such as myristic acid, palmitic acid, stearic acid, oleic acid, behenic acid, and sulfurized fish oil; and polyhydric alcohols, such as ethylene glycol, glycerol, and pentaerythritol. Such partial esters may be used singly or in mixtures. Preferably the above-described additives (B) to (E) are added to the end-capped polycarbonate (A) while the end-capped polycarbonate (A) is molten. Additionally, at least one compound (F) selected from phosphorous esters or trimethyl phosphate may be added in addition to (B) to (E). Such a component (F) is preferably added in amounts of 10 to 1,000 ppm, with 10 to 500 ppm preferred, wherein ppm is based on the end-capped polycarbonate (A).

Polycarbonate (A) and additives (B) to (E) can be kneaded in a conventional kneader, such as a single-screw extruder, a twin-screw extruder, or a static mixer. Such kneaders may or may not be vented.

By withholding the end-capping agent from the prepolymerization stage, at which point the polymer has a relatively low limiting viscosity, and by then adding the end-capping agent in a hermetically sealed piping, and then capping the ends of the polycarbonate during the postpolymerization stage at which point the polymer has a relatively high limiting viscosity, it is possible to carry out rapid and sufficient polymerization in the prepolymerization stage and impart the effects of the end-capping agent in the postpolymerization stage. It is thereby possible to increase the efficiency with which the end-capping agent is used and to dramatically increase the degree of polymerization of the aromatic polycarbonate produced. Additionally, effects such as hue, heat resistance resistant to thermal aging, and water resistance of the resulting aromatic polycarbonate are dramatically enhanced.

The apparatus for preparing the end-capped polycarbonate is characterized by the fact that at least two reactors, including a prepolymerization vessel and a postpolymerization vessel are connected in series by a piping, wherein the piping includes a charging port through which the end-capping agent can be charged to the piping in a hermetically sealed state. Additionally, the apparatus includes providing a static mixer for mixing the end-capping agent and the polycarbonate product in the piping.

FIG. 1 is a schematic drawing of such an apparatus. FIG. 1 shows an apparatus comprising a feed stock agitator tank 1 provided with feed stock drums 2a and 2b, prepolymerization tanks 4a and 4b provided with venting pipes 5a and 5b, piping 6 provided with static mixer 8, end-capping agent drum 7, and postpolymerization tank 9 provided with a venting pipe 5c. The apparatus can be arranged such that the aromatic dihydroxy compound and the carbonic acid diester are continuously fed from feed stock drums 2a and 2b, which are filled with aromatic dihydroxy compound and carbonic acid diester, respectively, through piping 3a and 3b, respectively, to feed stock agitator tank 1. Feed stock agitator tank 1 has an agitator blade (not shown) mounted on a vertical shaft (not shown) so that it can mix the feed stocks by agitation. The mixed feed stocks are fed to prepolymerization tanks 4a and 4b through piping 3c by means of a pump (not shown) where they are subjected to melt polycondensation. These prepolymerization tanks 4a and 4b may be each provided with an agitator blade (not shown) with a vertical rotating shaft (not shown), and reduced pressure is maintained in the prepolymerization tanks 4a and 4b by means of venting pipes 5a and 5b provided in the top parts of the tanks. The prepolymerization tank may be multistage, consisting of at least two stages as shown in FIG. 1, or it may have a single stage. However, two-to-four stages are preferred. The reaction mixture is fed through piping 6 by means of a pump (not shown) to postpolymerization tank 9.

The apparatus may also comprise static mixers such as those shown in FIGS. 2 and 3. The mixers are preferably provided in piping 6 as shown in FIG. 1 and FIG. 3 in such a way that polycarbonate and end-capping agent are mixed en route to the postpolymerization tank. As alternatives to the static mixers as shown in FIGS. 2 and 3, the apparatus may comprise a hermetically sealed mixing drum for mixing the end-capping agent and the polycarbonate product, which may be provided midway along the piping.

After the end-capping agent and the polycarbonate product are introduced, the mixture is fed to postpolymerization tank 9. Postpolymerization tank 9 is preferably a horizontal polymerization agitator tank typically used in the postpolymerization process, i.e., a horizontal processing apparatus for high-viscosity liquids, having one, two, or more horizontal rotating shafts. One or a combination of two or more agitator blades are provided on this horizontal shaft, for example, discoid, wheel-type; paddle-type, rod-type, or window-frame-type agitator blades, and at least two stages are provided per rotating shaft. These agitator blades comb through or spread out the reaction solution, continuously exposing the surface of new portions of the reaction solution. Reduced pressure is maintained inside the tank by a venting pipe 5c provided in the top part of the tank.

By means of an apparatus for preparing end-capped polycarbonates as disclosed herein, it is possible to carry out polymerization rapidly and to a sufficient degree in the prepolymerization stage and to sufficiently impart the conventional effects of end-capping agents in the postpolymerization stage. It is also possible to obtain aromatic polycarbonates with improved hue, heat resistance, resistance to thermal aging, water resistance, and the like without sacrificing the degree of polymerization in the polymers produced. Additionally, through means of the apparatus and process disclosed herein, it is possible to efficiently prepare a polycarbonate having a low number of hydroxyl end groups. Also, volatilization of the end-capping agent is reduced in the subsequent reactor without sacrificing molecular weight.

The above-described Figures disclosing the reaction process and apparatus are merely examples, and the present disclosure is not limited by them. Furthermore, the present disclosure is described specifically by means of working examples herein below; however, the disclosure is not in anyway limited by these examples.

EXAMPLES

The physical properties of the polycarbonates were evaluated as follows: The number average molecular weight (Mn) was measured by gel permeation chromatograpy (GPC).

To determine the terminal hydroxyl group concentration, 0.4 gram of the polycarbonate obtained above was dissolved in 3 milliliters of chloroform, and the quantity of terminal-hydroxyl groups and chain terminating groups was determined by Carbon Nuclear Magnetic Resonance ($^{13}$C—NMR) (Nihon Denshi Kabushiki Kaisha GX-270) at 40° C.

The end-capping rate was calculated from the total number of terminal groups and the number of chain terminating groups measured by $^{13}$C—NMR. The end-capping rate (%)=(number of chain-terminating groups/total number of terminal groups)×100.

A blank polycarbonate sample for use in both the working and comparative examples was first prepared. An apparatus having one agitator tank for mixing the raw ingredients, two prepolymerization tanks, and two horizontal polymerization (postpolymerization) tanks, was used for polymerizing the polycarbonate. The reaction conditions in the polymerization tanks are as shown in Table 1 below:

[t1]

TABLE 1

| Component | Pressure (mmHg) Atmospheric pressure | Temperature (° C.) | Mean Residence Time (Minutes) |
|---|---|---|---|
| Agitator tank | (Nitrogen atmosphere) | 160 | 2 |
| Prepolymerization tank I | 100 | 230 | 1 |
| Prepolymerization tank II | 20 | 270 | 0.5 |
| Horizontal agitator polymerization tank I | 2 | 300 | 0.5 |
| Horizontal agitator polymerization tank II | 0.5 | 300 | 0.5 |

Molten bisphenol A transported via direct piping from an apparatus for preparing bisphenol A (feed rate, 36.0 kilograms/hour (kg/h)), molten diphenyl carbonate transported via direct piping from distillation (DPC; feed rate, 35.5 kg/h), 2.5×10$^{-4}$ moles of tetraammonium hydroxide (TMAH) per mole of bisphenol A, and 1×10$^{-6}$ mole of sodium hydroxide (NaOH) per mole of bisphenol A were continuously fed to the agitator tank maintained at the above temperatures. The mixture was sequentially fed to prepolymerization tank I, prepolymerization tank II, horizontal agitator tank (postpolymerization tank) I, and horizontal agitator polymerization tank II at a feed rate of 36.0 kg/h of bisphenol A to perform polymerization under the above-described conditions to produce a blank polycarbonate.

The physical properties of the blank polycarboante are shown in Table 2.

To determine the effects of a hermetically sealed mixing drum on the formation and properties of an end-capped polycarbonate, Examples 1 and 2 were separately formed by collecting 127 grams of the blank polycarbonate obtained as described in Example 1 in a 500-mL vertical polymerization device equipped with an agitator and a pressure-reduction device. The polycarbonate was then completely melted over a period of 25 minutes at 300° C. Diphenyl carbonate (DPC) end-capping agent was then added in the amounts shown in Table 2, and premixed by stirring at 250 rpm in a hermetically sealed state for the periods of time shown in Table 2, e.g., for 10 minutes in Example 1, and for 1 minute in Example 2. Next, the reaction product was further reacted for 20 minutes at 1 torr, and distilled, to obtain the capped polycarbonate.

Comparative Example A was obtained by an operation identical to that in Examples 1 and 2, except that premixing in a hermetically sealed state was not carried out. Comparative Example B was obtained by an operation identical to that in Examples 1 and 2, except that the end-capping agent was added and then premixing was performed in an open state (in a nitrogen atmosphere at ordinary pressure).

The effects of the hermetically sealed mixing drum is shown in Table 2 below.

[t2]

ing the reaction mixture at a rate of 3 kg/h from the monomer agitator tank 1 to the stage-one vertical reactor 4a, stage-two vertical reactor 4b, and stage-three horizontal reactor 9, while continuously removing byproduct phenols from each of the reactors 4a, 4b, and 9, to obtain the polycarbonate.

Examples 3–9 (end-capped polycarbonates) were prepared as described for Reference 1, except that end-capping agents were used in the formation of the end-capped polycarbonates of Examples 3–9, and the premixing time at which the polycarbonate and the end-capping agent were mixed inside piping 6. The type and amount of end-capping agent and the premixing times is shown in Table 3, wherein the following abbreviations are used:

TABLE 2

|  | Blank Polymer | Example 1 | Example 2 | Comparative Example B | Comparative Example B |
|---|---|---|---|---|---|
| Type of end-capping agent | — | DPC | DPC | DPC | DPC |
| Amount (moles/hydroxyl groups before reaction) | — | 4 | 4 | 4 | 4 |
| Premixing time (minutes) | — | 10 | 1 | 0 | 10(open) |
| Mn | 8670 | 8820 | 9540 | 9415 | 6770 |
| Mn retention rate vs. blank (%) | — | 101.7 | 110 | 108.6 | 78.1 |
| Terminal hydroxyl groups (ppm) | 745 | 505 | 610 | 660 | 320 |
| End-capping rate (%) | 81 | 86.9 | 82.9 | 81.7 | 93.7 |
| Effective end-capping agent utilization rate (%)* | — | 8.1 | 4.5 | 2.9 | 14.3 |

*Effective end-capping agent utilization rate (%) = Molar reduction in hydroxyl groups versus blank/moles of end-capping agents charged As shown in Table 2, the effective end-capping agent utilization rate was extremely low when the reaction was conducted without mixing. For example, the effective utilization rate of the end-capping agent in Comparative Example 1 was only at least about 35% the rate found in Working Example 1, and only at least about 63% the rate found in Working Example 2. Furthermore, the reaction between the end-capping agent and polymer (transesterification) was excessive and molecular weight decreased at least about 20% in an open system (Comparative Example 2) when compared to Working Example 1, and at least about 28% when compared to Working Example 2. This data, therefore, shows that mixing the end-capping agent with the polycarbonate enhances the utilization of the end-capping agent, thereby making the capping process more efficient. The data also indicates that when the end-capping agent is mixed in a hermetically sealed environment, larger molecular weight polycarbonates can be obtained efficiently.

To determine the effects of a static mixer on the formation and properties of an end-capped polycarbonate, Reference 1 (uncapped polycarbonate) was formed by the melt polycondensation of a polycarbonate using the polymerization apparatus provided with two static mixers 8 arranged in a row in piping 6 as shown in FIG. 1. The static mixers 8 used were of the type shown in FIG. 2. Polycondensation was conducted by continuously feeding to monomer agitator tank 1 the feed stocks DPC and bisphenol A at a molar ratio of 1.08:1 and at a combined rate of 3 kg/h. Additionally, $2.5 \times 10^{-4}$ mole of TMAH and $1 \times 10^{-6}$ mole of sodium hydroxide (NaOH) per mole of bisphenol A were added to the monomer agitator tank 1 as catalysts. Continuous melt polycondensation was then conducted by continuously feed-

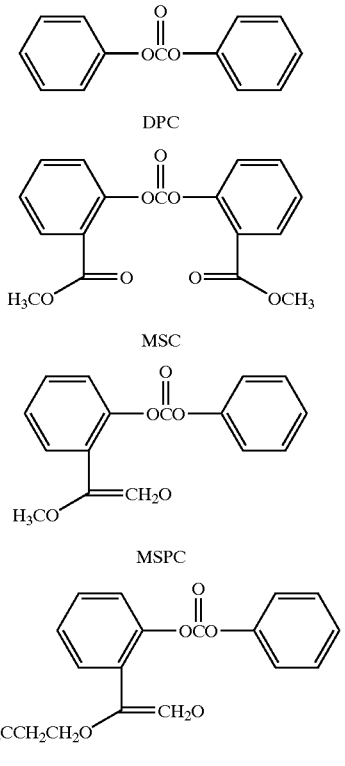

Comparative Example C was prepared in a manner identical to that in Example 3, except that the end-capping agent was added without the provision of a static mixer.

The effects of the static mixer are shown in Table 3.

[t3]

TABLE 3

|  | Reference | Ex. 3 | Ex. 4 | Ex. 5 | Ex. 6 | Ex. 7 | Ex. 8 | Ex. 9 | Ex. C |
|---|---|---|---|---|---|---|---|---|---|
| End-capping agent | — | DPC | DPC | DPC | 1/1 Molar DPC/MSC | 1/1 Molar DPC/MSC | MSPC | n-PSPC | DPC |
| Amount of agent (moles/hydroxyl groups in blank polymer) | — | 0.77 | 0.77 | 0.85 | 0.77 | 0.77 | 0.77 | 0.77 | 0.77 |
| Premixing time (minutes) | — | 5 | 25 | 25 | 5 | 25 | 5 | 5 | No static mixer |
| Mn | 8300 | 8000 | 7880 | 7700 | 7300 | 6520 | 7500 | 7360 | 8200 |
| Percentage of Mn achieved vs. blank | — | 96.4 | 94.9 | 92.8 | 88 | 78.6 | 90.4 | 88.7 | 98.8 |
| Terminal hydroxyl groups (ppm) | 1630 | 1250 | 930 | 710 | 1000 | 1030 | 910 | 740 | 1530 |
| End-capping rate (%) | 60.2 | 70.6 | 78.5 | 84 | 78.6 | 80.3 | 80 | 84 | 63.1 |
| Effective end-capping agent utilization rate (%)* | — | 31 | 57 | 68 | 51 | 49 | 59 | 66 | 8 |

*Effective end-capping agent utilization rate (%) = Molar reduction in hydroxyl groups versus blank/moles of end-capping agents charged As shown in Table 3, the effective end-capping agent utilization rate was extremely low when the reaction was conducted without mixing with a static mixer. For example, the effective utilization rate of the end-capping agent in Comparative Example C was only at least about 25% the rate found in Example 3. Furthermore, the number of terminal hydroxyl groups still remaining in Comparative Example C is more than about 1.20 times the number of terminal hydroxyl groups remaining in Example 3. This data, therefore, shows that using a static mixer to form the capped polycarbonate results in a more effective utilization rate of the end-capping agent, thereby making the capping process more efficient.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without separating from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for preparing an end-capped polycarbonate comprising:

melt reacting an aromatic dihydroxy compound, a carbonic acid diester, and optionally a catalyst in a prepolymerization vessel to form a polycarbonate product;

transferring said polycarbonate product from said prepolymerization vessel;

mixing said polycarbonate product with an end-capping agent under hermetic seal at a pressure of at least about 760 mm Hg; and transferring said polycarbonate product and end-capping agent mixture to a postpolymerization vessel to endcap said polycarbonate product.

2. The process of claim 1, wherein phenol byproducts formed from said melt reacting are continuously removed from said prepolymerization vessel.

3. The process of claim 1, wherein said polycarbonate product and said end-capping agent are mixed in a hermetically sealed mixing drum or a static mixer in fluid communication with said prepolymerization vessel and said postpolymerization vessel.

4. The process of claim 3, wherein said end-capping agent is preheated to 120° C. to 200° C. prior to mixing.

5. The process of claim 1, wherein said end-capping agent comprises 0.5 to 2 moles of said end-capping agent per equivalent of said polycarbonate product's terminal hydroxyl groups.

6. The process of claim 1, wherein said end-capping agent is described by formula (I) below and wherein said end-capping agent boils in said postpolymerization vessel, and wherein said mixing of said end-capping agent and said polycarbonate product is no less than 30 seconds to no more than 10 minutes:

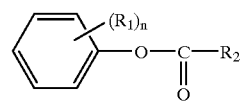

wherein $R_1$ is an electron-attractive group selected from the group consisting of halogen atoms, nitro groups, and alkoxycarbonyl groups having 1 to 30 carbon atoms; and $R_2$ is an alkyl group having 1 to 30 carbon atoms, an alkoxyl group having 1 to 30 carbon atoms, an aryl group having 6 to 30 carbon atoms, or an aryloxy group having 6 to 30 carbon atoms; and n is an integer from 1 to 3.

7. The process of claim 6, wherein said end-capping agent comprises 2-methoxy carbonylphenyl phenyl carbonate and 2-ethoxycarbonylphenyl phenyl carbonate.

8. The process of claim 1, wherein said end-capping agent is described by formula (II) below wherein said end-capping agent boils in said postpolymerization vessel, and wherein said mixing of said end-capping agent and said polycarbonate product is at least 10 minutes and up to 60 minutes:

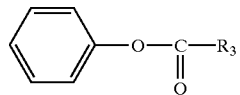

wherein $R_3$ is an alkyl group having 1 to 30 carbon atoms, alkoxyl group having 1 to 30 carbon atoms, an aryl group having 6 to 30 carbon atoms, or an aryloxy group having 6 to 30 carbon atoms, and when $R_3$ is an aryloxy group with 6–30 carbon atoms, said end-capping agent does not contain an electron-attractive group such as halogen atoms, nitro groups, or alkoxycarbonyl.

9. The process of claim 8, wherein said end-capping agent comprises diphenyl carbonate and phenyl p-cumyl carbonate.

10. An apparatus for preparing an end-capped polycarbonate comprising:
   a prepolymerization vessel having and inlet and an outlet;
   a postpolymetization vessel having an inlet and an outlet;
   a mixer in fluid communication with said outlet of said prepolymerization vessel and said inlet of said postpolymerization vessel; and
   a charging port through which an end-capping agent is charged to said mixer, wherein said mixer is hermetically sealed at greater than or equal to 760 mm Hg.

11. The apparatus of claim 10, wherein said mixer is a static mixer or a mixing drum.

12. The apparatus of claim 11, wherein said static mixer comprises:
   a first guide plate array having at least two triangular first guide plates arranged circumferentially, wherein said first guide plates are positioned at the upstream end of said static mixer and incline from a bottom part of said first guide plates wherein said bottom part is attached to an inner wall of a piping; and
   a second guide plate array having a same number of triangular plates as said first guide plate array wherein said second guide plates are arranged circumferentially, and wherein said second guide plates incline from an apex near a central axis wherein said second guide plates are attached to said inner wall of said piping.

13. The apparatus of claim 11, wherein said static mixer comprises:
   a first mixing element having a rectangular plate twisted 180° in a first direction;
   a second mixing element having a rectangular plate twisted 180° in a second direction wherein said second direction is in a direction opposite that of said first direction of said first mixing element.

14. The apparatus of claim 10, wherein said postpolymerization vessel is a horizontal polymerization agitator tank having one or more horizontal rotating shafts.

* * * * *